3,509,167
CERTAIN 3-NITROIMIDAZO-[1,2-a]PYRIDINES
Max W. Miller, Stonington, Conn., assignor to Chas. Pfizer & Co., Inc., New York, N.Y., a corporation of Delaware
No Drawing. Filed Sept. 18, 1967, Ser. No. 668,660
Int. Cl. C07d 31/42
U.S. Cl. 260—296                              3 Claims

ABSTRACT OF THE DISCLOSURE

Certain novel 3 - nitroimidazo-[1,2,a]pyridine compounds useful in the treatment and prevention of trichomonal infections are disclosed and a method of preparing same is described.

BACKGROUND OF THE INVENTION

This invention relates to novel and useful nitroimidazole derivatives and, more particularly, to certain 3-nitroimidazo-[1,2,a]pyridines which are effective antitrichomonal agents. Examples of trichomonal infections include trichomonal vaginitis, a troublesome vaginal infection caused by the parasitic protozoan *Trichomonas vaginalis* and bovine trichomoniasis caused by *Trichomonas foetus*. Up to now, various medicaments and methods of treatment have been used with varying degrees of effectiveness. Moreover, in the treatment of vaginitis a number of different drug classes are involved, for example, sulfonamides, fungicides, penicillin, vaginal cleansers, etc. In addition, product forms such as ointments, jellies, creams, powders, oral tablets and others have been used.

SUMMARY OF THE INVENTION

Accordingly, the present invention discloses compounds having the formula:

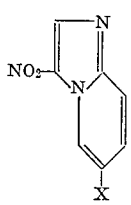

wherein X is selected from the group consisting of H, halogen (F, Cl, Br, I), carboxy, nitro, trifluoromethyl, trifluoromethylsulfonyl, sulfonamido, trifluoromethylcarbonyl, sulfurpentafluoride, trifluoromethylamino, alkyl, alkyloxy, alkyloxycarbonyl and alkylsulfonyl, said alkyl groups containing from 1 to 4 carbon atoms; and the pharmaceutically-acceptable acid addition salts thereof.

Particularly desirable examples includes 3,6-dinitroimidazo-[1,2,a]pyridine, 3-nitroimidazo-[1,2,a]pyridine and 3-nitro-6-chloroimidazo-[1,2,a]pyridine.

DETAILED DESCRIPTION OF THE INVENTION

The novel compounds of this invention are prepared by the synthetic scheme outlined hereinbelow:

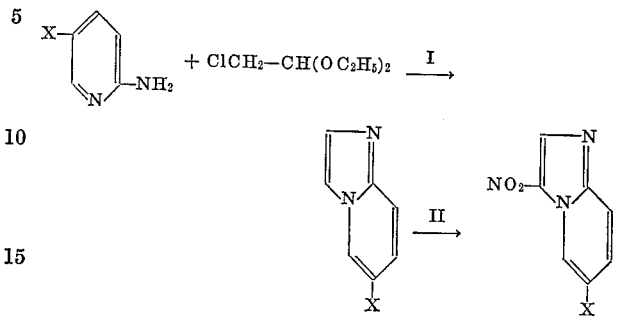

wherein X is as defined earlier. Step I is a condensation reaction between chloroacetal and an appropriately 5-substituted-2-aminopyridine to yield the corresponding 6-substituted-[1,2,a]pyridine derivative. Of course, if X is hydrogen, the molecule is unsubstituted. This particular reaction is carried out in the absence of solvent. To an acidic aqueous solution of chloroacetal is added the 2-amino-5-substituted pyridine. On completion of addition, the resulting mixture is heated at reflux for about 4 hours. After this time and upon cooling, the pH of the reaction mixture is adjusted to pH 7 with a 10% aqueous $Na_2CO_3$ solution and the product which precipitates is filtered and may be recrystallized. On a mole-wise basis, a ratio of 1:2 of pyridine derivative to chloroacetal is most preferred.

The second step of the overall process (II) is a simple nitration procedure wherein the intermediate 6-substituted imidazo-[1,2,a]pyridine compound is reacted with nitric acid in order to place a nitro substituent in the 3-position. The product may be recrystallized from any suitable solvent, for example, acetonitrile.

The 3-nitroimidazo-[1,2,a]pyridine compounds disclosed herein are preferably administered as such or in the form of acid addition salts containing pharmaceutically-acceptable anions. Examples of acids which provide pharmaceutically-acceptable anions are hydrochloric, hydrobromic, hydroiodic, nitric, sulfuric, or sulfurous, phosphoric, acetic, lactic, citric, tartaric, oxalic, succinic, maleic and gluconic. The conversion of the herein disclosed compounds to their acid addition salts comprises treating said compounds with a substantially equimolar amount of a chosen acid in a suitable organic solvent such as methanol or ethanol. Since the acid addition salts of the novel compounds disclosed herein are somewhat unstable under aqueous conditions, especially in aqueous acid solutions, it is preferred to prepare such salts under anhydrous conditions. When such salts are to be used for human consumption, either orally or parenterally, the acids which are used to prepare the pharmaceutically-acceptable addition salts must, of course, be those which necessarily form non-toxic acid addition salts.

The method of treatment employed for the control of trichomonal infections which is particularly preferred is oral administration, however, topical and parenteral application are also found to be suitable. Moreover, said oral medicament can be supplied in the form of a tablet formulation characterized by high trichomonadicidal power and capable of giving symtomatic relief to the host.

On a body-weight basis, a dosage of about 5 mg. to about 25 mg. per kilogram per day is appropriate. However, the physician will determine the dosage which will be most suitable for an individual patient and it will vary with age, the weight and response of the particular patient. The above dosages are exemplary of the average host. There can, of course, be individual cases where higher or lower dosage ranges are merited, and such are within the scope of this invention.

The activity of the novel herein disclosed compounds is determined by an in vivo test in the following manner: Animals to be tested are inoculated with a trichomonal test organism (intra-peritoneally). Dose levels of anti-trichomonal agent ranging from 10 to 200 mg./kg. is administered orally over a period of three days once a day. On the completion of said time period, a comparison, is made based on the number cleared of infection/number of infected animals, between those treated with the herein disclosed anti-trichomonal agents and a control, 1-(2-hydroxyethyl)-2-methyl-5-nitroimidazole.

The following examples are provided by way of illustration and should not be interpreted as limiting the invention, many variations of which are possible without departing from the spirit or scope thereof.

Example I.—3,6-dinitroimidazo-[1,2,a]pyridine

Step A—6-nitroimidazo-[1,2,a]pyridine.—A solution containing chloroacetal (61 g., 0.4 mole) water (140 ml.) and conc. HCl (34 ml.) is heated at reflux for 20 minutes. The solution is then cooled and to it is added water (140 ml.) and 2-amino-5-nitropyridine (27.8 g., 0.2 mole) and the resulting mixture is then refluxed for 4 hours. After this time period, the mixture is cooled to room temperatures, the pH adjusted to 7 with 10% $Na_2CO_3$ solution and the solid product which precipitates filtered. The filtered solid is recrystallized from methanol to give 10.5 g. (32.2% yield) of product, M.P. 227–228° C.

Step B—3,6 - dinitroimidazo - [1,2,a]pyridine.—The product obtained above (7.2 g., 0.044 mole) is added portion-wise to $H_2SO_4$ (25 ml.) which is being stirred. The temperature rose to 35° C. and was maintained at that point with an ice-bath. Upon completion of addition, the solution was cooled to 5° C. and $HNO_3$ (10 ml.) was added dropwise keeping the temperature between 10° and 15° C. When adition is complete, the reaction mixture is stirred for 15 minutes at 5–10° C. and then poured into 300 ml. of ice. The solid material which precipitates is filtered, washed, dried and recrystallized from acetonitrile to give 7.0 g. (76.5%) of product, M.P. 192–193° C.

*Analysis.*—Calcd. for $C_7H_4O_4N_4$ (percent): C, 40.39; H, 1.94; N, 26.92. Found (percent): C, 40.78; H, 2.59; N, 27.08.

Example II.—3-nitroimidazo[1,2a]pyridine

The procedure of Example I is repeated (steps A and B) to prepare 3-nitroimidazo[1,2,a]pyridine wherein a stoichiometric equivalent amount of 2-aminopyridine is used in place of 2-amino-5-nitropyridine in step A and equivalent results are obtained.

Example III.—3-nitro-6-chloroimidazo-[1,2a]pyridine

The procedure of Example I is repeated (steps A and B) to prepare 3-nitro-6 - chloroimidazo - [1,2,a]pyridine wherein a stoichiometric equivalent amount of 2-amino-5-chloropyridine is used in place of 2-amino-5-nitropyridine in step A and substantial yields of products are obtained.

Example IV

The procedure of Example I (steps A and B) wherein the following 2-aminopyridine derivatives are used, in stoichiometric equivalent amounts, in place of 2-amino-5-nitropyridine to give good yields of the corresponding products:

| 2-aminopyridine derivative | Product |
| --- | --- |
| 2-amino-5-fluoropyridine | 3-nitro-6-fluoroimidazo-[1,2,a]pyridine. |
| 2-amino-5-bromopyridine | 3-nitro-6-bromoimidazo-[1,2,a]pyridine. |
| 2-amino-5-iodopyridine | 3-nitro-6-iodoimidazo-[1,2,a]pyridine. |
| 2-amino-5-carboxypyridine | 3-nitro-6-carboxyimidazo-[1,2,a]pyridine. |
| 2-amino-5-trifluoromethylpyridine | 3-nitro-6-trifluoromethylimidazo-[1,2,a]pyridine. |
| 2-amino-5-trifluoromethylsulfonyl-pyridine | 3-nitro-6-trifluoromethylsulfonyl-imidazo-[1,2,a]pyridine. |
| 2-amino-5-sulfonamidopyridine | 3-nitro-6-sulfonamidoimidazo-[1,2,a]pyridine. |
| 2-amino-5-trifluoromethylcarbonyl-pyridine | 3-nitro-6-trifluoromethylcarbonyl-imidazo-[1,2,a]pyridine. |
| 2-amino-5-sulfurpentafluoride-pyridine | 3-nitro-6-pentafluorothioimidazo-[1,2,a]pyridine. |
| 2-amino-5-trifluoromethylamino-pyridine | 3-nitro-6-trifluoromethylamino-imidazo-[1,2,a]pyridine. |
| 2-amino-5-methylpyridine | 3-nitro-6-methylimidazo-[1,2,a]pyridine. |
| 2-amino-5-ethylpyridine | 3-nitro-6-ethylimidazo-[1,2,a]pyridine. |
| 2-amino-5-butylpyridine | 3-nitro-6-butylimidazo-[1,2,a]pyridine. |
| 2-amino-5-methoxypyridine | 3-nitro-6-methoxyimidazo-[1,2,a]pyridine. |
| 2-amino-5-ethoxypyridine | 3-nitro-6-ethoxyimidazo-[1,2,a]pyridine. |
| 2-amino-5-butoxypyridine | 3-nitro-6-butoxyimidazo-[1,2,a]pyridine. |
| 2-amino-5-carbomethoxypyridine | 3-nitro-6-carbomethoxyimidazo-[1,2,a]pyridine. |
| 2-amino-5-carboethoxypyridine | 3-nitro-6-carboethoxyimidazo-[1,2,a]pyridine. |
| 2-amino-5-carbobutoxypyridine | 3-nitro-6-cargobutoxyimidazo-[1,2,a]pyridine. |
| 2-amino-5-methylsulfonylpyridine | 3-nitro-6-methylsulfonylimidazo-[1,2,a]pyridine. |
| 2-amino-5-ethylsulfonylpyridine | 3-nitro-6-ethylsulfonylimidazo-[1,2,a]pyridine. |
| 2-amino-5-butylsulfonylpyridine | 3-nitro-6-butylsulfonylimidazo-[1,2,a]pyridine. |

Example V

The nitroimidazole derivatives disclosed herein may be converted to their acid addition salts by the following general procedure: To a methanolic solution containing the nitroimidazole free base (1 mole) is added a stoichiometric equivalent amount of a suitable acid. The resulting solution is subsequently stripped free of solvent and the precipitated product is filtered and dried. Other solvents, for example, ethanol may be used. The following acid addition salts are typical examples prepared using the above procedure and substantial yields of product are obtained.

| Free base | Acid | Acid addition salt |
| --- | --- | --- |
| 3,6-dinitroimidazo-[1,2,a]-pyridine. | HCl | 3,6-dinitroimidazo-[1,2,a]pyridine hydrochloride. |
| 3-nitroimidazo-[1,2,a]pyridine. | HBr | 3-nitroimidazo-[1,2,a]pyridine hydrobromide. |
| 3-nitro-6-chloroimidazo-[1,2,a]pyridine. | HI | 3-nitro-6-chloroimidazo-[1,2,a]pyridine hydroiodide. |
| 3-nitro-6-fluoroimidazo-[1,2,a]pyridine. | Citric acid. | 3-nitro-6-fluoroimidazo-[1,2,a]pyridine citrate. |

Example VI

An evaluation is undertaken to determine the effectiveness of 3,6-dinitroimidazo-[1,2,a]pyridine, 3-nitroimidazo - [1,2,a]pyridine and 3-nitro-6-chloroimidazo-[1,2,a]pyridine against *T. foetus* in the following manner:

Mice are inoculated with *T. foetus* organism intraperitoneally. The experimental anti-trichomonal agent is then administered orally in doses ranging from 10–200 mg./kg. daily over a 3 day period. The effectiveness of said agent is based on the minimum effective dose (M.E.D.) level to clear infection of *T. foetus* in mice in comparison to a control, that is, mice treated with 1-(2- hydroxyethyl)-2-methyl-5-nitroimidazole and the following results are obtained:

| Anti-trichomonal agent | Drug level, mg./kg. M.E.D. | Treatment (days) | No. cleared/ No. infected |
|---|---|---|---|
| 3,6-dinitroimidazo-[1,2,a] pryidine | 100 | 3 | 8/10 |
| 3-nitroimidazo-[1,2,a] pyridine | 100 | 3 | 7/10 |
| 3-nitro-6-chloroimidazo-[1,2,a] pyridine | 200 | 3 | 10/10 |
| 1-(2-hydroxyethyl)-2-methyl-5-nitroimidazole (control) | 100 | 3 | 10/10 |

Example VII

The evaluation described in Example VI is repeated to determine the effectiveness of those compounds enumerated in Example IV. Good results are obtained in each instance.

What is claimed is:
1. A compound of the formula:

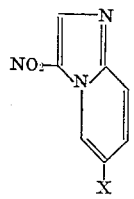

wherein X is selected from the group consisting of halogen, carboxy, nitro, trifluoromethyl, trifluoromethylsulfonyl, sulfonamido, trifluoromethylcarbonyl, sulfurpentafluoride, trifluoromethylamino, alkyloxy, alkyloxycarbonyl and alkylsulfonyl, said alkyl groups containing from 1 to 4 carbon atoms; and the pharmaceutically-acceptable acid addition salts thereof.

2. A compound as claimed in claim 1 wherein X is nitro.

3. A compound as claimed in claim 1 wherein X is chloro.

References Cited

Paolini et al.: J. Org. Chem., vol. 30 (12), pp. 4085–90 (1965).

HENRY R. JILES, Primary Examiner

A. L. ROTMAN, Assistant Examiner

U.S. Cl. X.R.

260—294.8, 295; 424—263, 266